Nov. 4, 1969                U. C. McMILLER                3,476,162
              LATCH MECHANISM FOR A CAR TOP CARRIER DOOR
Filed Feb. 1, 1968                                 2 Sheets-Sheet 1
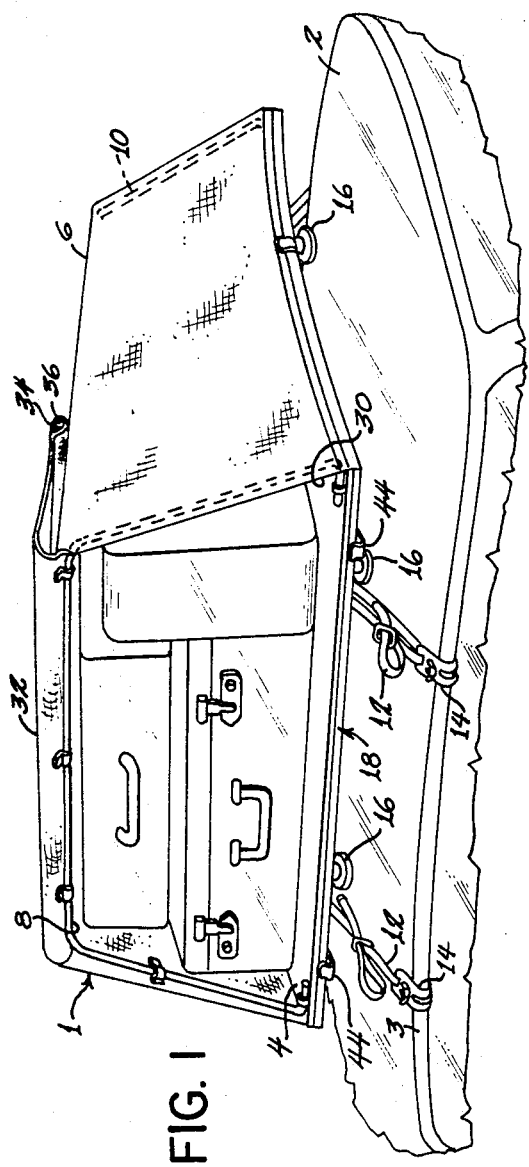
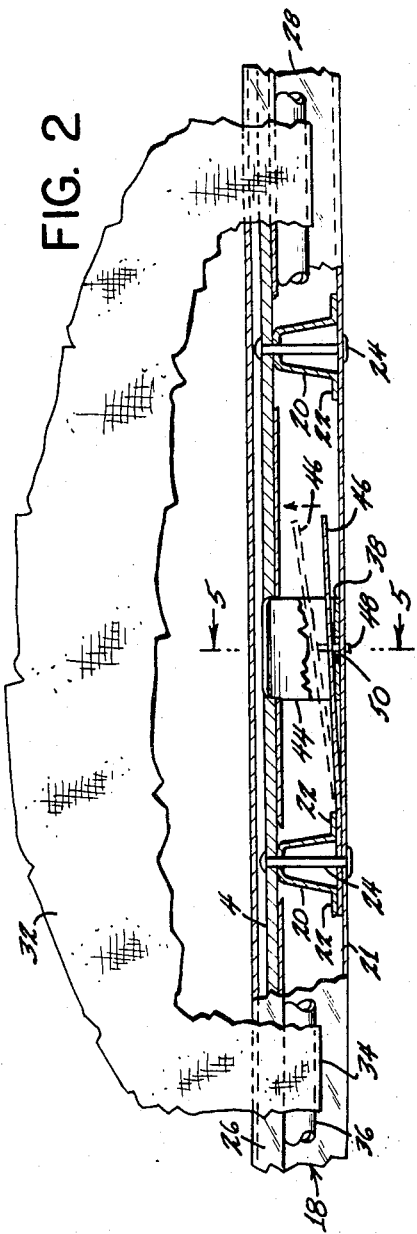
INVENTOR.
URBAN C. McMILLER
BY
Williamson, Palmatier + Bains
ATTORNEYS Nov. 4, 1969  U. C. McMILLER  3,476,162
LATCH MECHANISM FOR A CAR TOP CARRIER DOOR
Filed Feb. 1, 1968  2 Sheets-Sheet 2

INVENTOR.
URBAN C. McMILLER
BY
Williamson, Palmatier & Bains
ATTORNEYS

United States Patent Office 3,476,162
Patented Nov. 4, 1969

3,476,162
LATCH MECHANISM FOR A CAR TOP CARRIER DOOR
Urban C. McMiller, Minneapolis, Minn., assignor, by mesne assignments, to Beatrice Foods Co., Chicago, Ill., a corporation of Delaware
Filed Feb. 1, 1968, Ser. No. 702,336
Int. Cl. B60r 9/04; B65b 11/00
U.S. Cl. 150—52          9 Claims

ABSTRACT OF THE DISCLOSURE

A car top carrier having a flexible cover with a hinged closure flap covering an access opening in one side thereof, incorporates a latch mechanism having a shiftable arm contoured to embrace a bar running along one edge of the closure flap and hold the bar against an elongate channel strip which supportably engages one edge of the base of the carrier. A releasable detent holds the latch arm in its locked position, and is provided with attachment means for a padlock.

BACKGROUND OF THE INVENTION

Car top carriers of the type having a roof-mounted base cooperating with a flexible cover to form an enclosure within which luggage may be stored and transported conventionally have an access opening covered by a hinged or zippered closure flap. In order to provide at least a minimum of security for the luggage or other articles being transported in the car top carrier, it is desirable to provide some means for latching and locking the closure flap. With zippered access openings, this may be accomplished rather easily by fastening the zipper pull tab to a detent member of some type, by means of a padlock. However, hinge-type closure flaps do not readily lend themselves to the installation of uncomplicated latching devices.

BRIEF SUMMARY OF THE INVENTION

The primary objective of this invention is to provide a latch mechanism for the hinged closure flap of a car top carrier of the aforesaid type, the latching device being particularly characterized by its simplicity of construction and ease of operation.

My unique latching mechanism incorporates as its basic element a latch arm which is shiftably mounted beneath the base of the car top carrier, and which includes a retainer lip contoured to embrace a support bar secured to the elongated, free edge of the closure flap. The latch arm may be shifted from an open position to a closed position in which the retainer lip engages the support bar of the closure flap in restraining contact therewith.

As a particularly advantageous feature of my invention, I slidably support the aforesaid latch arm by means of an elongated, channel-shaped member which forms a portion of the base frame of the car carrier. The channel member includes a downwardly depending leg which extends below the base of the luggage carrier, and which is provided with a slot within which the aforesaid latch arm is slidably mounted.

A further beneficial aspect of my invention resides in the offsetting of the downwardly depending leg of the channel member, inwardly from the outer edge of the carrier base so that when the latch arm is shifted to its closed position, the aforesaid retainer lip will clamp the support bar running along the free edge of the closure flap against the downwardly extending leg and under the outer edge of the carrier base, thereby positively restraining the closure flap against upward, opening movement.

As a further beneficial feature of my invention, I employ a releasable detent member which locks the shiftable latch arm in place, and which is adapted to be locked in place in engagement with the latch arm.

These and other objects and advantages of my invention will become readily apparent as the following description is read in conjunction with the accompanying drawings, of which:

FIGURE 1 is a perspective view showing my improved luggage carrier mounted on top of an automobile;

FIGURE 2 is a fragmentary, front elevation view partially broken away to show the latch mechanism;

Figure 3:
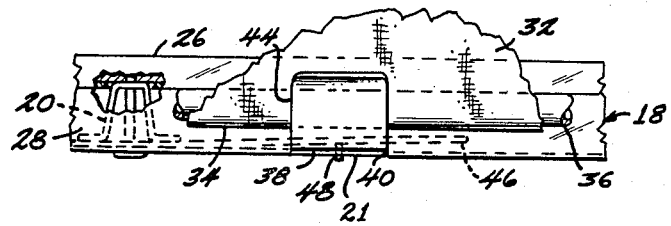
FIGURE 3 is a front, elevation view showing the latch arm in engagement with the free edge of the hinged closure flap.

With reference to FIGURES 1 through 3 of the drawings, my improved car top carrier, generally indicated by reference numeral 1, is shown attached to the roof 2 of a passenger automobile. Carrier 1 is comprised of a base or floor portion 4 and a flexible, top cover 6 which cooperate to form an enclosure within which luggage or other articles may be stored in the manner indicated in FIGURE 1. A collapsible frame assembly consisting of side bar members 8 and 10 connected by transversely extending members (not shown) supports cover 6 over base 4. Base 4 is releasably attached to the roof 2 of an automobile by means of adjustable straps 12 and clamps 14 which are secured to the rain gutters 3 running along opposite sides of the vehicle top. Carrier 1 is directly supported on roof 2 by means of nonmarring suction cups 16.

Figure 4:
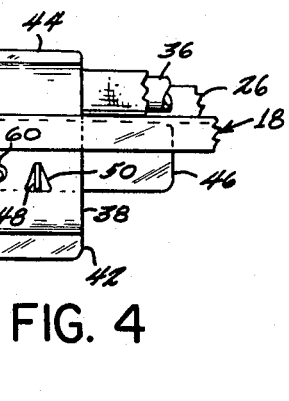
FIGURE 4 is a bottom view of the latch mechanism shown in FIGURE 3.

The solid base 4 is supported by an outside frame and undercarriage comprised of elongated, channel-shaped strips 18 which engage the longitudinal edges of base 4, and transversely extending support bars 20. As is best indicated in FIGURES 2 and 4, channel strips 18 are provided with an integral horizontal flange 21 which extend inwardly, and upon which feet 22 of transverse braces 20 rest. Braces 20 are secured between base 4 and flange 21 by means of fasteners 24. As may best be seen in FIGURE 5, longitudinal support strips 18 have an upper, channel-shaped portion 26 within which the longitudinal, outer edges of base 4 are supported. Channel strips 18 also include integral, downwardly depending legs 28 which are offset inwardly from the outer edges of base 4 for a reason fully explained below.

Top cover 6 is preferably made of flexible, water-impervious material such as vinyl, which is wear resistant. In order to provide ready access to the luggage stored within car top carrier 1, cover 6 is provided with an access opening 30 extending along one side wall thereof. Access opening 30 is normally closed by a closure flap 32 which is hingedly connected to the top of cover 6 along its top edge, and which may be swung back over the top of cover 6 in the manner indicated in FIGURE 1, to completely uncover opening 30. The free, lower edge of closure flap 32 is looped at 34 to embrace a support bar 36 which extends longitudinally thereof. In order to safeguard the luggage contained within car top carrier 1, I have provided a unique latch mechanism which may be very easily operated to firmly retain closure flap 32 in covering relation to access opening 30.

Figure 5:
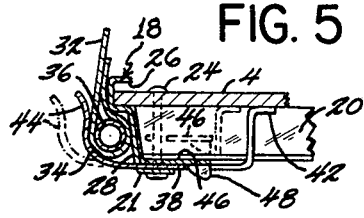
FIGURE 5 is a vertical, section view taken along lines 5—5 of FIGURE 2.

With reference to FIGURES 2 through 5, and in particular FIGURE 5, the latch mechanism is comprised of a shiftable arm 38 which is slidably mounted within slot 40 formed in the lower front face of downwardly dependingly leg 28 of channel strip 18. Latch arm 38 is slidably supported on horizontal flange portion 21 of support strip 18, and is provided with a flange 42 at its inner end which bears upon the underside of base 4. Although there may be other ways in which latch arm 38 could be shiftably supported under base 4, the arrangement shown, utilizing a horizontal flange 21 on channel strip 18 for this purpose, is deemed to be particularly desirable because of its simplicity and low cost.

At the outer end of latch arm 38 is an upwardly extending retainer lip 44 which is contoured to embrace support bar 36 at the lower end of cover flap 32. When cover flap 32 is lowered to its closed position, latch arm 38 is shifted inwardly to the solid line position shown in FIGURE 5 so as to bring retainer lip 44 into clamping engagement with rigid bar 36 and looped portion 34 of closure flap 32, within which bar 36 is supported. When it is desired to open cover flap 32, it is only necessary to pull shiftable arm 38 outwardly by grasping retainer lip 44. When latch arm 38 has been shifted outwardly from the locked position shown in FIGURES 3, 4, and 5 to the unlocked, phantom line position shown in FIGURE 5, cover flap 32 may be opened.

As a further means of positively securing cover flap 32 in its closed position, I have recessed downwardly depending leg 28 of channel strip 18 inwardly, as noted above. By virtue of this arrangement, longitudinally extending bar 36 will be held against leg 28 and under channel-shaped portion 26 of support strip 18 by retainer lip 44 when latch arm 38 is shifted to its locking position. Any upward force exerted on closure flap 32 in an effort to open it, will thus be resisted by the underside of channel 26 and the outer, longitudinal edge of base 4.

For the purpose of firmly retaining latch arm 38 in locking engagement with cover flap 32, releasable detent bar 46 is mounted along the top of horizontal flange 21 of channel strip 18 in overlying relationship with shiftable latch arm 38. As is indicated in FIGURES 2, 4, and 5, detent bar 46 is secured at one end between feet 22 of one of the transverse bases 20 and flange 21. Depending downwardly from detent bar 46 is a keeper tab 48 which extends through complementary aperture 50 in latch arm 38 in the manner best shown in FIGURE 4. Detent bar 46 is manufactured from flexible steel, and may be flexed upwardly to the phantom line position shown in FIGURES 2 and 5 in order to release keeper tab 48 from latch arm 38, thereby permitting arm 38 to be shifted outwardly to the unlatched, phantom line position of FIGURE 5.

For the owner, who is familiar with the operation of the aforesaid latch mechanism, it is a simple matter to reach under the side edge of base 4 and push detent bar 46 upwardly to release latch arm 38. However, for the casual passerby who might be tempted to try to remove the contents of luggage carrier 1 when the automobile is parked, the manner in which retainer lip 44 of latch arm 38 may be released from engagement with the lower, free edge of closure flap 32, is not readily discernible. The time required for the uninitiated to determine the manner of operation of the latching mechanism operates as a considerable detriment to thievery.

Figure 6:
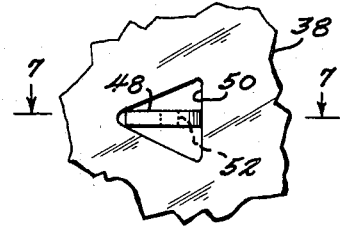
FIGURE 6 is a bottom view showing the detent member in engagement with the shiftable latch arm.
Figure 7:
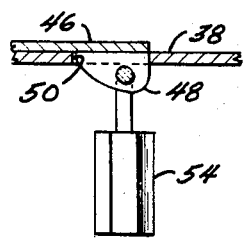
FIGURE 7 is a vertical section view taken along lines 7—7 of FIGURE 6.

Further protection against the opening of closure flap 32 may be obtained by providing a horizontally extending aperture 52 through keeper tab 48 as shown in FIGURE 6. A padlock 54 may then be installed through aperture 52 in the manner indicated in FIGURE 7. An alternative method of locking detent bar 46 in engagement with latch arm 38 is shown in FIGURE 4, wherein a padlock 56 is mounted at a 45 degree angle with its releasable locking bar 58 extending through aligned apertures 60 in latch arm 38 and detent bar 46. Other methods of attaching a padlock to detent bar 46 and latch arm 38 may obviously be employed, the particular locking arrangement of FIGURES 4 and 7 having been shown for illustrative purposes only.

The number of latching mechanisms required to properly hold closure flap 32 in its closed position will vary depending upon the length of the car top carrier. For relatively large carriers having a length of from five to six feet, two latch mechanisms may be mounted inwardly from the opposite ends of channel strip 18 in the arrangement shown in FIGURE 1.

Those skilled in the art will readily appreciate that the above-described latch mechanism is particularly desirable from the standpoint of appearance, ease of installation, and simplicity of operation. The cooperative relationship between contoured retainer lip 44 and elongated support bar 36 of closure flap 32 provides a particularly effective means of positively retaining closure flap 32 in its closed position. Various modifications and alternative arrangements to the latch mechanism which I have shown and described will undoubtedly occur to those skilled in the art. For example, latch arm 38 could be slidably supported on a bracket depending from the underside of base 4, rather than upon the lower portion of channel strip 18 in the arrangement shown and described. I contemplate that my improved latch mechanism may be subjected to various other modifications which will be within the spirit and scope of my invention.

I claim:

1. In a car top carrier having a generally horizontally extending base portion, and a flexible cover extending thereover, said cover having an access opening in one side wall thereof, improved closure means for said opening comprising:

a closure flap extending over said opening and having a hinged connection at one edge thereof to said cover;

a rigid, elongate locking member supported along the opposite, free edge of said closure flap;

a cooperating locking element shiftably supported adjacent the side of said opening opposite said hinged connection, and having a retainer lip shaped to engage said elongate locking member in restraining contact therewith, said locking element being movable between a first closed position in which said retainer lip is brought into engagement with said elongate locking member and a second, open position in which said retainer lip is disengaged from said elongate locking member so as to permit the opening of said closure flap.

2. A car top carrier as defined in claim 1, wherein: said closure flap is hinged at its top edge to said cover and extends downwardly in its closed position across said opening and beyond one longitudinal edge of said base portion a sufficient distance that said opposite, free edge thereof and said elongate locking member are disposed below said edge of said base portion and held thereunder by said retainer lip when said locking element is in said closed position.

3. A car top carrier as defined in claim 2, and further including:

a support member for said locking element mounted beneath said base portion of said car top carrier, said support member having a generally horizontally extending surface on which said locking element is slidably supported.

4. A car top carrier as defined in claim 3, wherein: said locking element is comprised of a base portion which slidably engages said horizontal surface of said support member, and wherein;

said retainer lip extends upwardly from the outer end of said base portion.

5. A car top carrier comprising:

a generally horizontally extending base;

a flexible cover supported over said base, said cover having an access opening in one side thereof;

a closure flap extending over said opening, the top edge of said closure flap being hingedly connected to said cover and the free, bottom edge thereof being disposed adjacent one longitudinal edge of said base when said closure flap is positioned in covering relationship to said opening;

an elongate, rigid member secured to said closure flap along at least a portion of said bottom edge thereof;

an elongate frame strip supportably engaging said base along said one longitudinal edge thereof;

a latch arm shiftably mounted adjacent said one edge of said base and having a closure flap retainer portion, said latch arm being movable from an open position to a closed position in which said retainer portion restrainedly engages said elongate, rigid member and holds it against said frame strip.

6. A car top carrier as defined in claim 5, wherein: said retainer portion of said latch arm is contoured to embrace said elongate, rigid member.

7. A car top carrier as defined in claim 5, wherein: said frame strip includes a generally horizontally extending flange portion beneath said base on which said latch arm is slidably supported.

8. A car top carrier as defined in claim 5, wherein: said frame strip includes a downwardly depending leg extending below said base, said leg being offset inwardly from said longitudinal edge of said base, whereby said elongate, rigid member is held under said edge of said base and against said downwardly depending leg by said retainer portion of said latch arm when said latch arm is moved to said closed position.

9. A car top carrier as defined in claim 5, and further including:

detent means supported beneath said base portion and including a flexible detent bar secured at one end and having a keeper member which releasably engages said latch arm when said latch arm is in said closed position.

References Cited

UNITED STATES PATENTS

| | | | |
|---|---|---|---|
| 2,621,836 | 12/1952 | McMiller | 224—42.1 |
| 3,000,418 | 9/1961 | Bitting | 150—52 |
| 3,263,881 | 8/1966 | Wooten | 224—42.1 |

DONALD F. NORTON, Primary Examiner

U.S. Cl. X.R.

224—42.1